Mar. 6, 1923.
J. BLACKBURN.
CONTROLLING DEVICE FOR MOTOR DRIVEN VEHICLES.
FILED MAY 20, 1918.

Inventor
Jasper Blackburn
by Edward E. Longan
Atty.

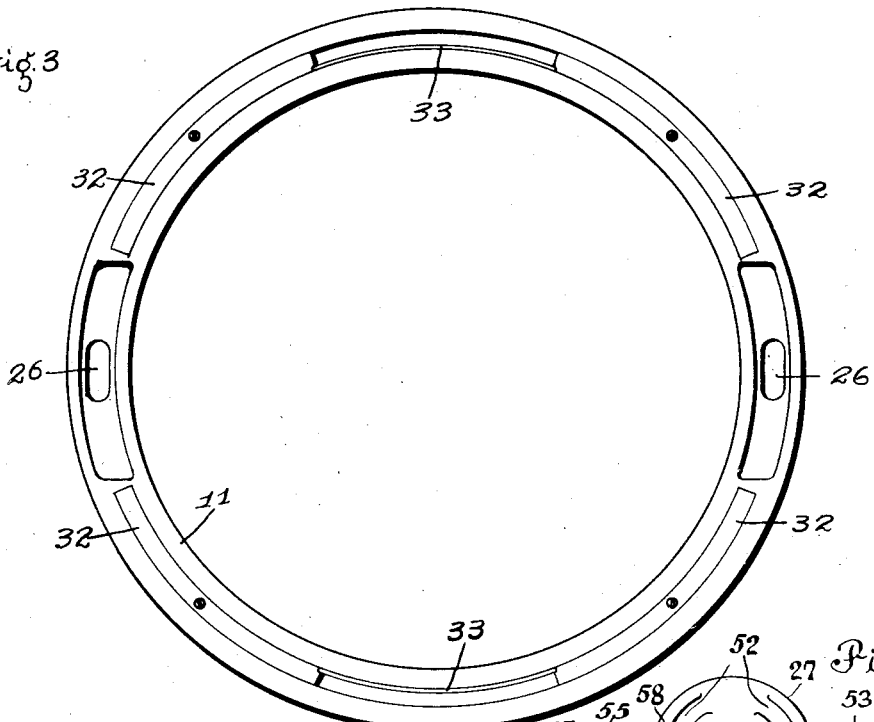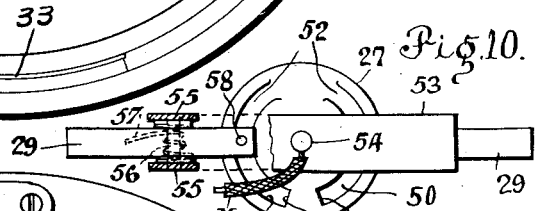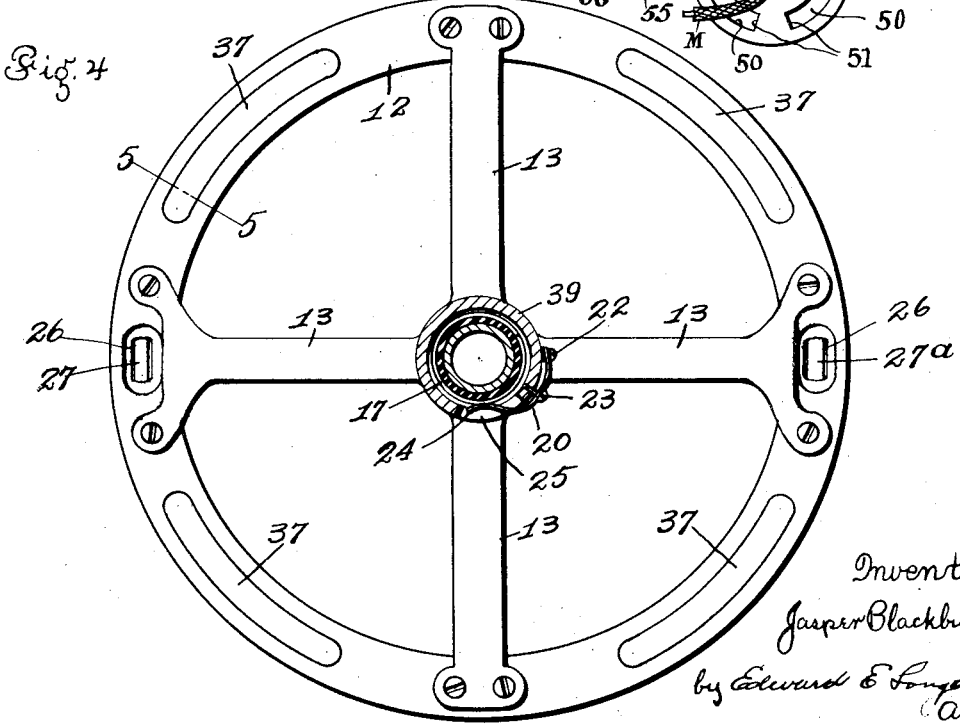

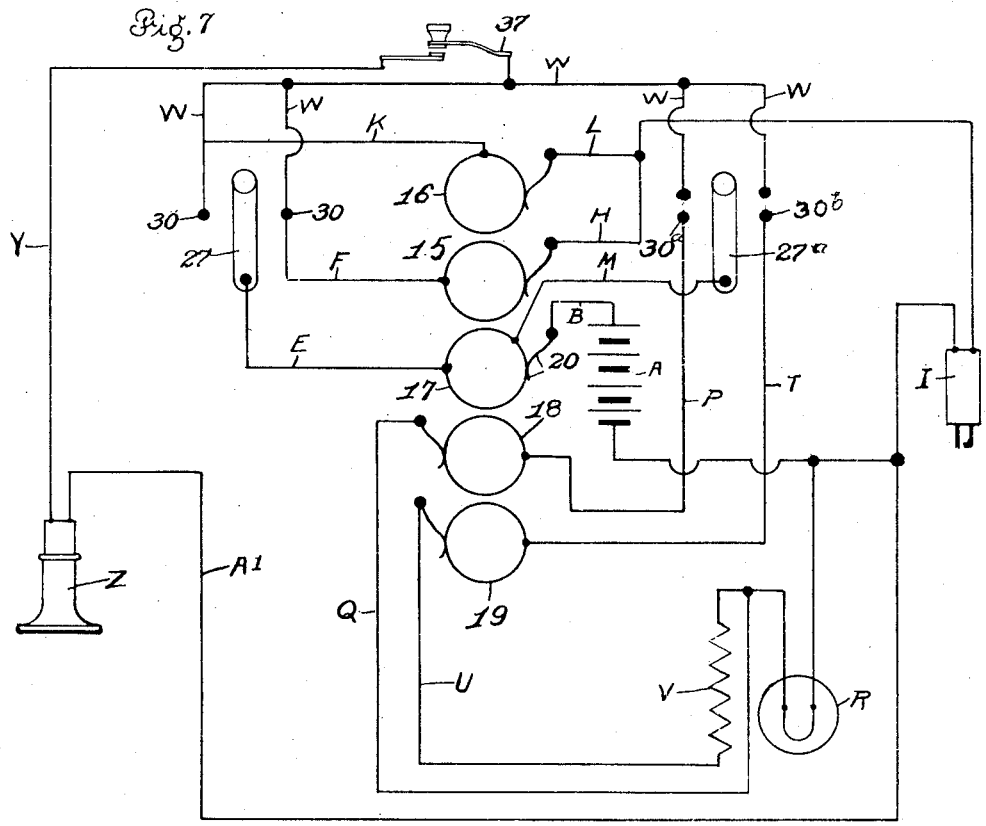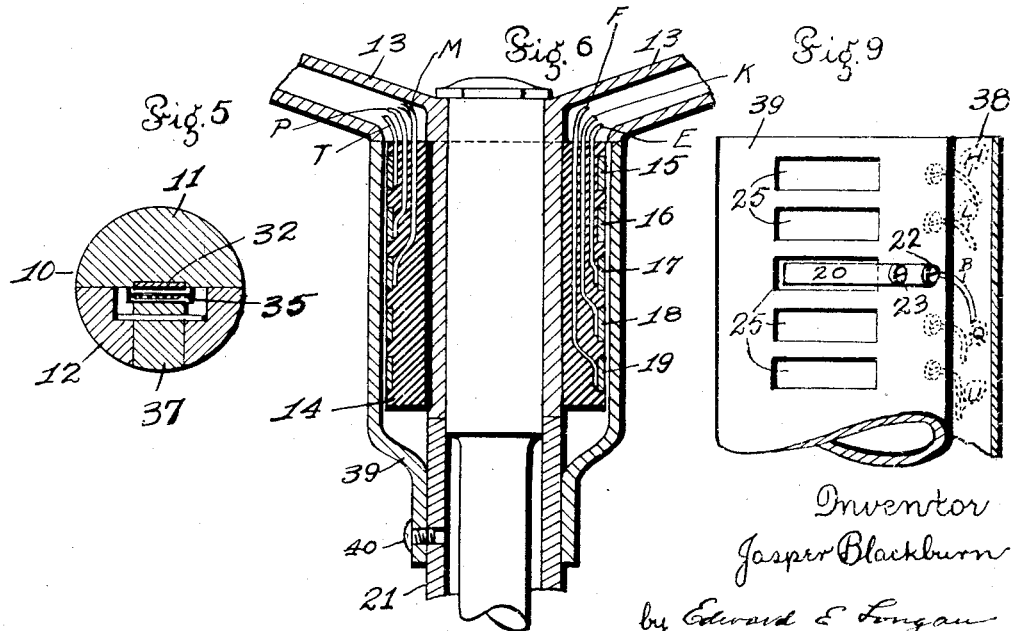

Patented Mar. 6, 1923.

1,447,751

UNITED STATES PATENT OFFICE.

JASPER BLACKBURN, OF ST. LOUIS, MISSOURI, ASSIGNOR TO THE BLACKBURN PATENT STEERING WHEEL COMPANY, OF ST. LOUIS, MISSOURI, A CORPORATION OF MISSOURI.

CONTROLLING DEVICE FOR MOTOR-DRIVEN VEHICLES.

Application filed May 20, 1918. Serial No. 235,648.

*To all whom it may concern:*

Be it known that I, JASPER BLACKBURN, a citizen of the United States, and resident of St. Louis and State of Missouri, have invented certain new and useful Improvements in Controlling Devices for Motor-Driven Vehicles, of which the following is a specification containing a full, clear, and exact description, reference being had to accompanying drawings, forming a part thereof.

My invention relates to controlling devices for motor driven vehicles, and has for its object, to provide a plurality of switches in the rim of a motor vehicle steering wheel. A further object is to provide a motor vehicle steering wheel with switches located in its rim so that the lighting, ignition and signalling devices may be operated without removing the hands from the wheel. A further object is to eliminate the instrument board and the danger of the operator losing control of the vehicle while reaching to manipulate several switches.

A further object is to provide a motor steering wheel with electric controlling devices situated in the rim thereof, so that a manual signal may be given, or the emergency brake operated; the horn or electric signal device placed in operation without removing more than one hand from the rim of the steering wheel. A further object is to construct a steering wheel wherein all the operating devices, such as the ignition, lighting and signal switches, are located in the rim of the steering wheel, and under immediate control of the operator without the necessity of removing his hands from the rim.

In the drawings:

Fig. 3 is a bottom plan view of the upper section of the wheel.

Fig. 4 is a bottom plan view of the wheel, with parts in section.

Fig. 5 is an enlarged cross sectional view taken on the line 5—5 of Fig. 4.

Fig. 6 is an enlarged cross sectional view of an insulating core carrying part of my contact mechanism, and showing the several wires which lead to the controlling switches.

Fig. 7 is a diagrammatical view of the numerous electrical connections together with their switches.

Fig. 9 is a side view of the upper end of the steering column sleeve 6, showing the slots through which the several spring brushes pass so as to enable their ends to contact with the rings formed on the hub of the steering wheel.

Fig. 10 is a side elevation of one of the rotary switches as made use of with parts broken away and in section.

Figure 1:
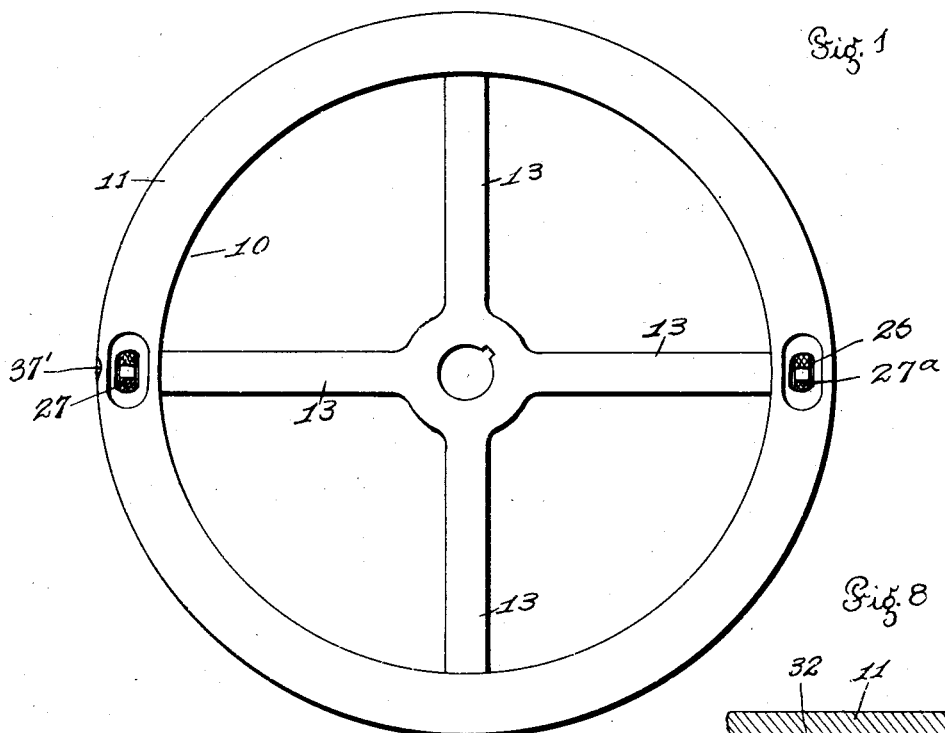
Fig. 1 is a top plan view of a wheel embodying my device.
Figure 8:
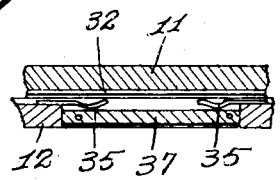
Fig. 8 is a longitudinal sectional view of one of the push bars, which operate the signal device.
Figure 2:
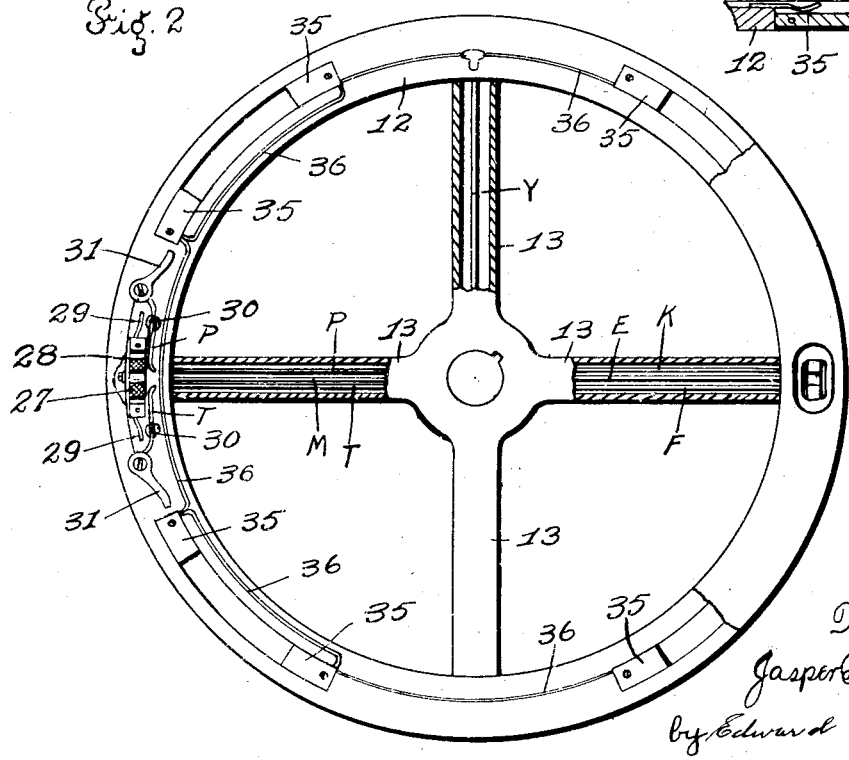
Fig. 2 is a plan view of the lower section of the wheel.

As shown in the drawings, 10 represents a steering wheel of an automobile, motor boat, airplane or other similar device, the rim of which being composed of an upper section 11 and a lower section 12. Spokes 13 are formed hollow, as shown in Fig. 2, and in these spokes wires leading to the several switches are located.

Around the hub of the steering wheel I place an insulating core 14; this core having rings 15, 16, 17, 18 and 19 imbedded therein. The ring 17 serves as a primary conductor, and is connected direct to a battery or other suitable source of energy. This energy is delivered to the ring by means of a spring brush 20 secured to the sleeve 39, which is held securely to the steering column 21 by means of a screw 40. The tension of this spring brush is controlled by a screw 23. The free or contacting end 24 of the brush passes through a slot 25 formed in the sleeve 39, and the wire connected to this brush is secured thereto by the screw 22. This brush connection is the same for the rings 15, 16, 18 and 19, with the only difference that the wires leading from these brushes are connected to the several parts which I desire to operate by means of the switches.

The upper and lower portions 11 and 12 respectively of the steering wheel are provided with a pair of openings through which discs 27 forming part of a rotary switch project. This rotary switch is well known to the trade and may be purchased at electrical supply houses, and therefore its construction will not be described in detail. The discs 27 operate the switches 28, the one being for ignition and the other for lighting.

The tongues 29 of these switches are pivotally mounted and contact with, and are operated by means of inclined recesses formed in one face of the discs 27 when the same are turned, while the ends or terminals 30 lead to the various devices through which the electrical current is to be sent, so that by turning the disc one way one of the tongues 29 will be brought in contact with that portion of the switch leading to the desired translating device and by operating the disc in the opposite direction another translating device is connected, in other words, through a switch of this kind it is possible to have the lights on an automobile either dimmed or thrown on full by the operation of one switch, or to connect the spark plug by the operation of the other switch in either direction. The terminals 30 are provided with spring contact points 31 which contact with the conducting plates 32 when the device or portions of the wheel are secured together and transfer electrical energy thereto when any of the rotary switches 27 are operated. These plates 32 are connected together in pairs by means of the conducting wire 33 so that a continuous circuit will be established between the pairs of plates.

In the lower half of the wheel, I place a number of spring contacts 35, which are connected together by wires 36. These spring contacts are actuated by the push bars 37 situated on the underside of the lower half of the steering wheel, and substantially flush with the outer surface thereof. These push bars operate the spring contacts 35 which will complete the electrical circuit to the horn or signal device, and there is always one of these push bars within reach of the driver or operator of the wheel, and can be operated without sliding the hands around the rim of the wheel by merely pressing the tips of the fingers against one or more of the bars.

Adjacent to one of the discs, and in the rim of the wheel, I form a notch 37'; this notch designating preferably the lighting switch, so that when it is desired to turn on the lights, it may readily be found in the dark, regardless of the position of the steering wheel, by the touch.

Referring to Fig. 7, the ring 17 is connected directly to the battery A by means of the wire B and the brush 20. This ring is connected to the ignition switch 27 by the wire E. The wire F is connected to the ring 15 and the contact point 30. When the switch 27 is thrown on the contact point 30, the current will travel through the wire H into the spark plug I, and thence back into the battery A, completing the circuit.

When the switch 27 is thrown on to the contact point 30, the current will pass through the wire K, into the ring 16, and thence into the wire L, through the spark plug I, and back into the battery, by this means the ignition circuit is closed no matter in which direction the switch 27 is thrown or operated.

The wire M leads from the ring 17 to the light switch $27^a$, and when this switch is thrown on the contact point this will also contact with the point $30^a$ so that the current will pass through wire P, thence into the ring 18, through the wire Q, into the light R, and back into the battery. When the switch $27^a$ is thrown on to the contact point and simultaneously on $30^a$, the current will pass through the wire T into the ring 19, thence into the wire U through the resistance coil V, thence into the light R, thence back into the battery. This is used when it is intended to dim the light.

Connected to the contact posts 30 and $30^a$ are wires W, which are connected to the push bar 37. From this push bar 37 leads a wire Y connected to an automobile horn Z, and from this leads a wire $A^1$, which is connected to the battery. Thus it will be seen that the automobile horn is always in condition for action when either the lighting or ignition switches are on without however interfering with each other, and when these are turned off, will do away entirely with the proverbial small boy wasting the electric current by blowing the horn when the machine is parked.

As will be seen in Fig. 4, two of the arms 13 of the spider are forked at their fastening points so as to allow the rotary discs to pass through the lower surface of the rim so that the same may be operated from either above or below the wheel, or the thumb and one of the fingers may grip this disc, enabling the manipulator to have more purchase on the same.

As will be observed from Fig. 9, the wires which lead from the source of supply and to the several parts to be operated, are connected to the spring brushes by means of the screw 22. These wires are then led downwardly through the conduit 38, which is secured along the steering post in any desired manner, thus entirely concealing these wires, as well as eliminating any possibility of being torn loose.

It will be noted from Fig. 10 that the disc 27 is provided with grooves 50. These grooves are tapered and are deepest at the points indicated by the numeral 51 and end at the points indicated by the numeral 52, flush with the surface of the wheel or disc 27. The disc 27 is mounted in a frame 53 by means of a screw or pin 54. The frame 53 is attached to a conductor M. The frame 53 is also provided at its ends with ears 55, through which, a pin 56 passes. This pin also supports the tongues 29 of the switches. These tongues are normally held away from the contact points 30 by means of a spring 57. The tongues 29 are provided with a pin 58 which projects in the grooves or slots 50, and are adapted to contact with the lower surface thereof. It will be noted that the slots 50 extend only partially around the surface of the disc 27, so that when the disc is turned in one direction, one pin will ride forward on the lower surface of the slot or groove and move the tongue 29 inward. The other tongue remaining undisturbed. It is in this manner that the disc switches are operated, the turning of the disc in one direction moving one tongue, while turning the disc in the opposite direction releases the tongue just moved and operates the tongue which has remained stationary. The distance in which the disc is turned, being limited by the contact of the pin 58 with the shoulders or points 51 which are at the deepest portion of the grooves 50, so that it is impossible to revolve the disc 27 a complete turn. It is to be understood, of course, that the pins 58 commence to contact with the bottom of the groove 50 when the disc 27 is in the position shown in Fig. 10. In that event, the disc being revolved to the right, the tongue on the right hand side will be operated toward the contact point 30, while the pin 58 in the left hand tongue will be out of contact with the bottom of the groove 50, and the spring 57 will hold the tongue 29 against the face of the disc and prevent any accidental contact being made.

I claim:

1. A device of the class described comprising a steering wheel having a spider provided with hollow spokes and a hub, a rim composed of an upper and lower section mounted on the spider, switches and electrical conductors located in the lower half of the rim, electrical conductors located in the upper half of the rim, means for connecting the switches and last mentioned conducting rings mounted on the spider hub, conductors leading from the rings to the various switches and conductors carried by the lower half of the rim and conductors leading from the rings to the various translating devices and a suitable source of supply of energy.

2. A device of the class described comprising a steering wheel having a spider provided with a hub and hollow spokes, a rim composed of two channeled sections, switches located in the lower half of the rim, electrical conductors located in the upper and lower halves of the rim, said conductors extending only partially around said rim, a core of insulating material mounted on the hub, electric conductors for connecting the switches and conductors in the lower half of the rim, rings secured to the insulating core, said rings being secured to the electric conductors through the spokes, a pair of switches located in the lower half of the rim and extending through both sections, and push bars located in the underside of the lower half of the rim.

3. A device of the class described comprising a steering column, spring brushes attached to the steering column and insulated therefrom, a spider extending partially within the steering column, said spider having hollow arms, a rim composed of two sections secured to the arms of the spider, switches and push bars located in the lower half of the rim, an interrupted metallic circuit located in the upper half of the rim, a plurality of insulated conducting rings on the incased portion of the spider with which the brushes contact and wires connecting the rings and switches through the hollow arms.

4. A device of the class described comprising a steering column, spring brushes attached to the steering column and insulated therefrom, slots formed in the steering column through which the spring brushes pass, an insulating core, a spider to which said core is attached, a plurality of rings imbedded in said core, said rings and core located within the steering column, a two piece rim secured to the outer ends of the hollow spokes, switches and conductors concealed within said rim, said conductors being attached to the rings, and electric conductors leading from the spring brushes to the various translating devices to be operated and to the source of electrical energy.

5. A device of the class described comprising a steering wheel having a rim composed of two channeled sections, semi-circular in cross section, a spider having hollow spokes and a hub connected to said rim, electric contact making and breaking devices carried by and projecting through the upper and lower section of the rim, an insulating core having conductor rings mounted on the hub of said spider, electric conductors secured to said rings and the electric contact making and breaking devices, spring brushes contacting with said rings, electric conductors connecting said brushes and various translating devices and the source of electrical energy, all of said conductors being concealed and protected throughout their length.

6. A device of the class described, a steering column, a steering wheel whose rim is formed of an upper and a lower channeled section, a spider having a hub and hollow spokes connected to said rim, translating devices, rotary contact making and breaking devices carried by the lower section of the rim and projecting through both sections thereof, push bars carried by the lower sections and projecting slightly therethrough, an insulating core mounted on said hub, conducting rings imbedded in said insulating core, electric conductors mounted in the rim channels, electric conductors extending through the hollow spokes for connecting the conducting rings and conductors located in the rim channel, and a sleeve mounted on the steering column, said sleeve adapted to enclose the insulating cores and conductor rings.

7. A device of the class described comprising a steering wheel having a rim formed of two channeled sections mounted on a spider, having hollow spokes, rotary contact making and breaking devices carried by the lower section of the rim and projecting through both sections thereof, and a plurality of push bars carried by the lower section and projecting therethrough so as to be operable from the underside of the wheel.

8. In a device of the class described comprising a steering wheel consisting of a hollow spoked spider and a rim formed of two complementary channeled sections carried by the spokes, an electric conductor formed of oppositely disposed conducting plates, spaced apart and secured to the bottom of each channel, conductors located in each channel for connecting said plates in pairs, and rotary switches having a spring contact for electrically connecting the pairs of plates.

9. A device of the class described comprising a spider having hollow spokes and a hub, a plurality of rings surrounding said hub and insulated therefrom, a rim composed of an upper and lower channeled section mounted on the spider, switches mounted in the lower half of the rim, conductors located in the spider and connected to the switches and rings, spring brushes contacting with the rings, electric conductors connected to the spring brushes and leading to suitable sources of supply and delivery.

In testimony whereof, I have signed my name to this specification, in the presence of two subscribing witnesses.

JASPER BLACKBURN.

Witnesses:
  EDWARD E. LONGAN,
  WALTER C. STEIN.